Oct. 9, 1928.
R. W. FOX
TUBE CLOSURE
Filed April 23, 1927
1,686,520
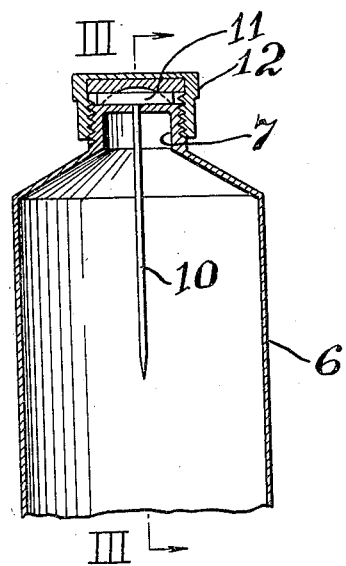
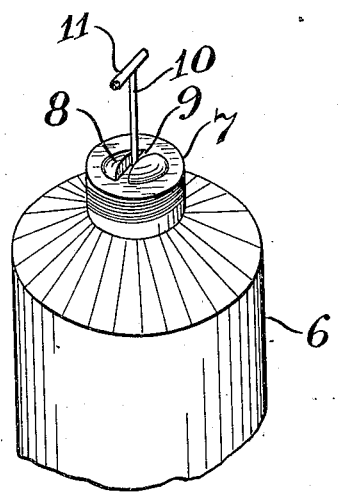
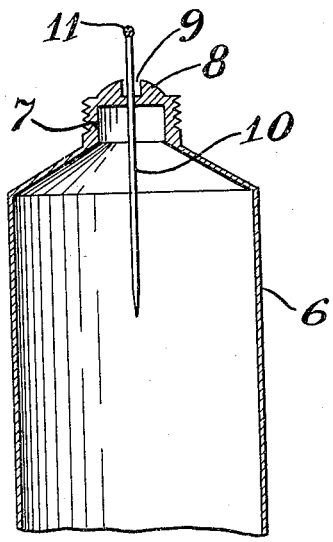
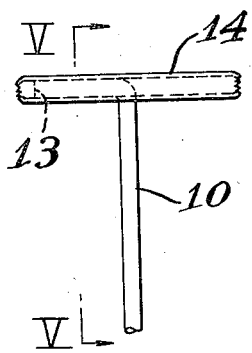
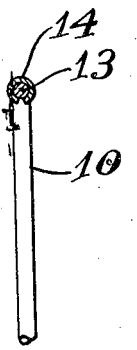
Inventor
R. W. Fox.
By
Attorney Patented Oct. 9, 1928.

1,686,520

UNITED STATES PATENT OFFICE.

RICHARD W. FOX, OF BIRMINGHAM, ALABAMA.

TUBE CLOSURE.

Application filed April 23, 1927. Serial No. 186,112.

My invention relates to a closure for tubes containing liquids, such as is used in connection with the application of cold patches to automobile tire tubes and the like.

The object of my invention is to provide a closure that adds no appreciable expense to the tube; which enables the tube when shipped to be effectively sealed against the escape of its contents without being entirely dependent upon the threaded cap to prevent leakage; and which provides for the use of a standard type of fine pin to close a very small discharge hole in the tube and to remain detachably seated in the tube without interfering with the removal or replacement of the screw cap.

Where the fluid liquid is to be discharged from the tube the best results are obtained where the discharge hole is very small as this prevents waste, but such very small holes are hard to keep open, and while it has been suggested in connection with tubes containing paste and the like that the cap should be provided with a stud or pin which will enter and keep the hole free, I have found that it is impractical commercially to produce a screw cap carrying a pin fine enough to enter the proper sized hole for the discharge of freely flowing liquids. My invention, by the use of the separate pin capable of being housed between the cap and nipple, enables me to provide the proper sized discharge hole and to keep it open.

The preferred construction of my invention and its advantages and uses will be better understood by reference to the accompanying drawings and the following specification and claims.

In the drawings:—

Fig. 1 is a cross-sectional view of the sealed tube.

Fig. 2 is a perspective view of the delivery end of the tube showing the pin being inserted.

Fig. 3 is a cross-sectional view showing the pin being inserted to close the tube opening.

Figs. 4 and 5 are detail views of the pin preferably used in my invention.

Similar reference numerals refer to similar parts throughout the drawings.

In my invention as shown, a conventional soft tube 6 for containing fluid material has a threaded discharge nipple 7 provided with a boss 8 bisected by a cross groove or channel 9 which leaves the metal thin in the nipple under the groove so that the shank 10 of the sealing pin can be readily inserted in the discharge hole 15 while its T-head 11 is of size and shape suitable to be received in the groove 9. The pin head 11 is of less diameter than the nipple 7 so that its ends do not interfere with the removal and replacement of the screw cap 12, which is of standard construction. The type of pin which I prefer has its upper end bent at an angle at 13 and housed in a tubular sleeve 14 which projects equi-distantly on each side of the shank. The lower end of the pin shank is pointed as shown and is adapted to be thrust through a center hole 15 in the groove 9 in the nipple and when mounted in place to be entirely protected by the cap 12. A number of extra pins can be supplied with the outfit. The pin does not interfere with the movement or replacement of the cap 12 and serves to maintain unobstructed the hole 15 for the discharge of the fluid contents of the tube. The rounded boss 8 on the nipple is serviceable for spreading the fluid material as applied to the patch or other point of use.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. A closure for tubes of the character described, comprising a threaded nipple having a convex transversely grooved end, with a relatively small dispensing hole in the bottom of the groove, a pin adapted to be inserted into the tube through the dispensing hole and having a head adapted to be received in the groove, and a cap adapted to be screwed on the nipple and against its grooved end and the pin head mounted in the groove.

2. A closure for tubes of the character described, comprising a nipple having a raised boss therein bisected by a transverse groove, said groove having a relatively small round hole centrally located in the bottom wall thereof, a pin having a shank fitting in the hole and having a T-head adapted to be received in said groove flush at the center and exposed at the ends of the groove, and a screw cap adapted to screw on the nipple over the pin head, as and for the purposes described.

In testimony whereof I affix my signature.

RICHARD W. FOX.